US006309578B1

(12) United States Patent
Maeda et al.

(10) Patent No.: US 6,309,578 B1
(45) Date of Patent: Oct. 30, 2001

(54) METHOD OF PRODUCING WATERPROOF CONNECTOR HOUSING HAVING ELONGATED SLIP-OFF PREVENTING PIECES

(75) Inventors: Akira Maeda; Toshifumi Suzuki, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/430,167

(22) Filed: Oct. 29, 1999

Related U.S. Application Data

(62) Division of application No. 09/018,952, filed on Feb. 5, 1998, now Pat. No. 6,146,174.

(30) Foreign Application Priority Data

Feb. 7, 1997 (JP) .................................................... 9-025345

(51) Int. Cl.[7] ............................ B29C 33/10; B29C 70/80

(52) U.S. Cl. ............................ 264/273; 264/267; 264/275

(58) Field of Search ..................................... 264/255, 268, 264/267, 273, 274, 275; 425/116, 812

(56) References Cited

U.S. PATENT DOCUMENTS

| | | | | |
|---|---|---|---|---|
| 4,724,113 | * | 2/1988 | Lee | 264/276 |
| 5,336,101 | * | 8/1994 | Kasugai et al. | 439/272 |
| 5,861,120 | * | 1/1999 | Yagi et al. | 264/255 |

* cited by examiner

*Primary Examiner*—Angela Ortiz
(74) *Attorney, Agent, or Firm*—Armstrong, Westerman, Hattori, McLeland & Naughton, LLP

(57) ABSTRACT

A waterproof connector housing is provided. This waterproof connector housing includes a housing main body, a hood portion for engaging with a mating housing via a stair portion provided on the housing main body, an elastic seal ring for maintaining water-tightness with the mating housing inside the hood portion, and a holding portion for the elastic seal ring on the terminal insertion surface of the housing main body. With this waterproof connector housing, the elastic seal ring can be easily molded, and the amount of wasted raw material can be dramatically reduced. Also, the hood portion can take various forms and be made smaller.

1 Claim, 3 Drawing Sheets

FIG.1B1

FIG. 2
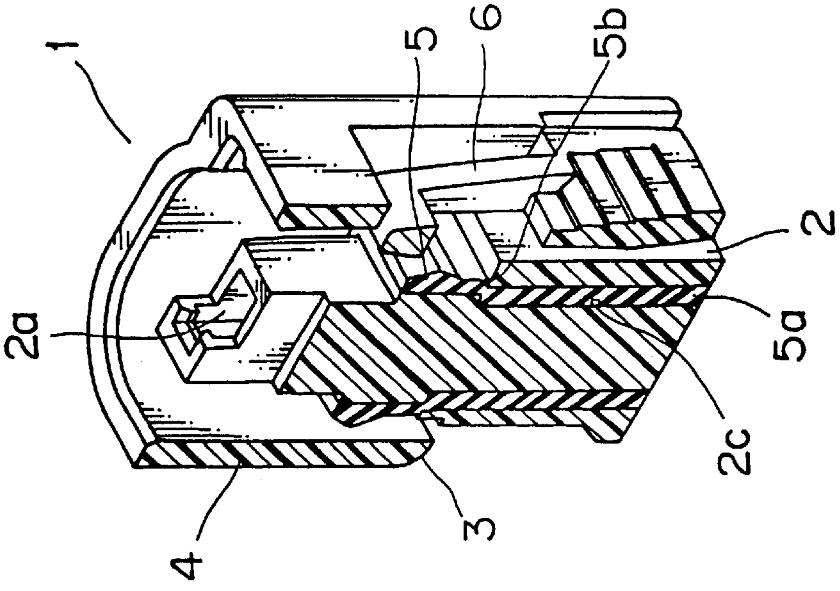
FIG. 3
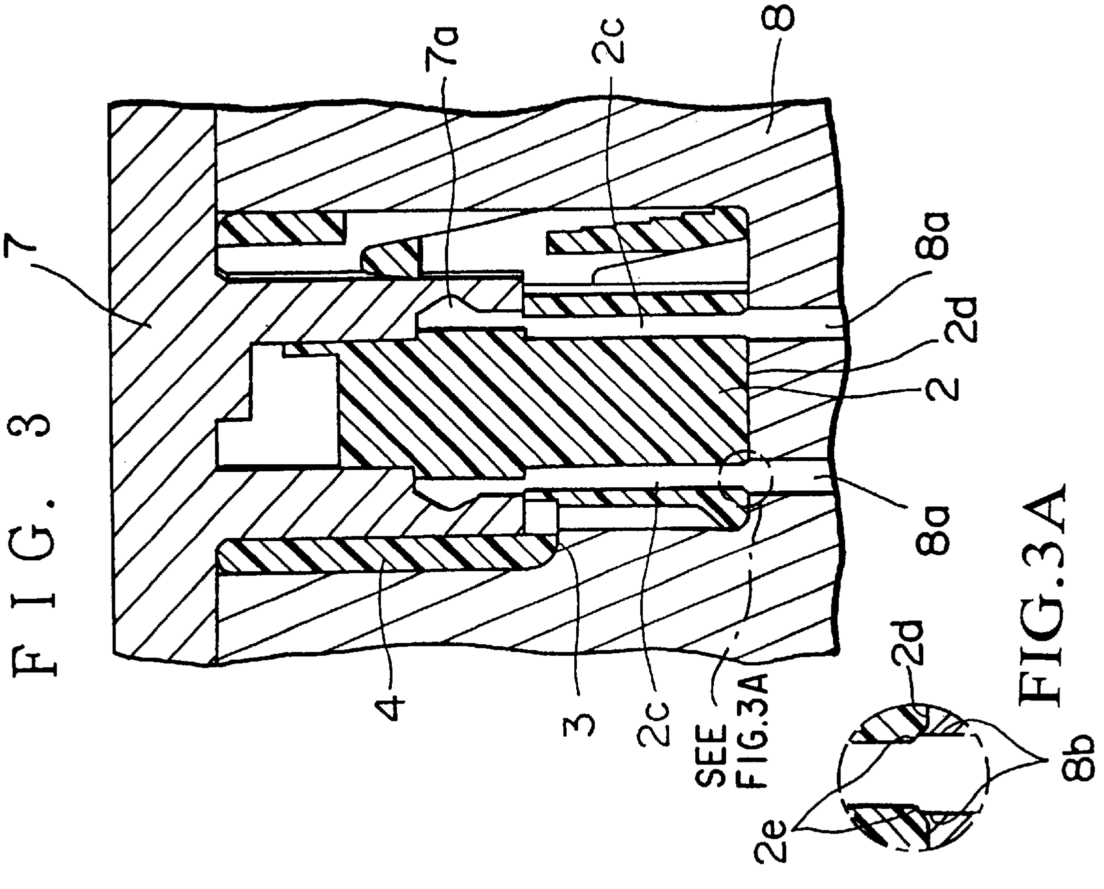
FIG.3A

METHOD OF PRODUCING WATERPROOF CONNECTOR HOUSING HAVING ELONGATED SLIP-OFF PREVENTING PIECES

This application is division of prior application Ser. No. 09/018,952 filed Feb. 5, 1998, now U.S. Pat. No. 6,146,174.

BACKGROUND OF THE INVENTION

1. Field of the Invention

The present invention relates to a waterproof connector housing and a method of manufacturing the same, and also to a mold used in manufacturing the same.

2. Related Art

FIG. 4A is a sectional view of a connector housing a of the prior art. In FIG. 4A, reference numeral a1 indicates a connector housing main body, and a hood portion a3, required for engaging a mating housing (not shown), expands from the connector housing main body via stair portions a2. Inside the hood portion a3, an elastic seal ring a4 is provided for maintaining water-tightness between the hood portion a3 and the mating housing.

FIG. 4A is a sectional view of a connector housing a of the prior art. In FIG. 4A, reference numeral a1 indicates a connector housing main body, and a hood portion a3, required for engaging a mating housing (not shown), expands from the connector housing main body via stair portions a2. Inside the hood portion a3, an elastic seal ring a4 is provided for maintaining water-tightness between the hood portion a3 and the mating housing. This elastic seal ring a4 is provided with slip-off preventing pieces a5 which engage with slip-off preventing holes a6 so as to prevent the elastic seal ring a4 from slipping off at the time of insertion or pulling-out of the mating housing. A terminal receiving chamber a7 for receiving terminals is provided inside the housing main body a1, and terminal stopping pieces 8 for stopping terminals are provided inside the terminal receiving chamber a7. A terminal receiving chamber a7 for receiving terminals is provided inside the housing main body a1, and terminal stopping pieces 8 for stopping terminals are provided inside the terminal receiving chamber a7.

The above waterproof connector housing a is manufactured as follows. As shown in FIG. 4B, an intermediate product integrally consisting of the housing main body a1 and the hood portion a3 molded by injection molding is set beforehand in a cavity formed by an upper mold b1 and a lower mold b2. An elastic material or its raw material (hereinafter referred to as "elastic raw material") is introduced into elastic seal ring cavity portions b4 from elastic material introducing portions b3 provided on the lower mold b2 through the slip-off prevention piece holes a6 of the hood portion a3. After that, the elastic seal ring a4 is formed by curing and/or reaction, and the mold is then opened to take out the obtained waterproof connector.

This waterproof connector is less likely to lose the elastic seal ring, and exhibits an excellent water proofing ability. However, there is a problem that less freedom is allowed in design when providing a locking mechanism for locking a mating connector to the hood portion or forming irregularities for preventing wrong connections. If the engaging area between the slip-off prevention pieces a5 and the prevention piece holes a6 is increased to improve reliability in preventing slip-off of the elastic seal ring, the hood portion of the corresponding portion has to be thickened accordingly, resulting in increases in size and weight of the hood portion. This is very disadvantageous in such a field as car manufacturing in which many wires need to be arranged in a small space.

Another disadvantageous point of the conventional waterproof connector in car manufacturing is that since a runner inside the mold has to detour around the hood portion a3 in FIG. 4B, which is the thickest part in the connector housing, so as to be connected to the two elastic material introducing portions b4, the path for the elastic raw material becomes long, and it is troublesome and time-consuming to take out the material cured and reacted inside the runner. In such case, the raw material is often wasted. If the two elastic material introducing portions b4 are merged into one, a short shot is caused, reducing yield as well as reliability in waterproofing.

The above disadvantages in manufacturing cannot be avoided even if a housing c shown in FIG. 4C is employed. In this housing c, a hood portion c3 is formed as an expansion from a housing main body c1 via stair portions c2. The housing c is the same as the housing a in that an elastic seal ring c4 is provided inside the hood portion c3, but slip-off prevention pieces c5 of the elastic seal ring c4 are engaged with slip-off prevention piece holes c6 formed at the stair portions c2.

When molding the elastic seal ring c4 in such case, the runner of the mold detours around the housing main body, which is thinner than the hood portion. Thus, the disadvantages in manufacturing can be eliminated to some extent. However, the stair portions c2 still need to be larger than the slip-off prevention piece holes c6. Because of this, it is difficult to shorten the outer diameter of the hood portion c3, and there is a limit to the design of the hood portion c3. Furthermore, various irregularities often need to be formed on the side surfaces of the housing main body. In such case, it is difficult to secure the elastic material introducing portions, and there is a limit to the design of the housing main body.

SUMMARY OF THE INVENTION

The principal object of the present invention is to provide a waterproof connector housing. With this waterproof connector housing, it is easy to mold an elastic seal ring and reduce the amount of wasted raw material. Also, the hood portion can take various forms and be made smaller.

To achieve the above object, the present invention provides a waterproof connector housing which comprises a housing main body, a hood portion expanding from the housing main body for engaging with the mating housing via a stair portion, an elastic seal ring for maintaining water-tightness with the mating housing inside the hood portion, and a holding portion for the elastic seal ring which communicates with the terminal insertion surface of the housing main body.

The present invention also provides a method of manufacturing the above waterproof connector housing. This method comprises the steps of setting the housing main body provided with a hood portion formed beforehand to a mold for molding an elastic seal ring, and forming the elastic seal ring by introducing a fluid elastic material or its raw material through a holding portion linking hole which links the terminal insertion surface of the housing main body to an elastic seal ring cavity.

The present invention further provides a waterproof connector housing mold used in manufacturing the waterproof connector housing. This waterproof connector housing comprises a holding portion linking hole for linking the terminal insertion surface of the housing main body to an elastic seal ring cavity, and an elastic material introducing portion for receiving the housing main body provided with a hood portion formed beforehand and for introducing an elastic material or its raw material. The elastic material introducing portion is in contact with the holding portion linking hole.

The above and other objects and features of the present invention will be more apparent from the following description taken in conjunction with the accompanying drawings.

BRIEF DESCRIPTION OF THE DRAWINGS

FIG. 2 is a perspective view of the waterproof connector housing taken along line B—B of FIG. 1C;

FIG. 3 illustrates a method for forming an elastic seal ring of an embodiment of the waterproof connector housing of the present invention;

DESCRIPTION OF THE PREFERRED EMBODIMENTS

FIGS. 1A to 3C and FIG. 2 illustrate an embodiment of the waterproof connector housing of the present invention.

Figure 1A:
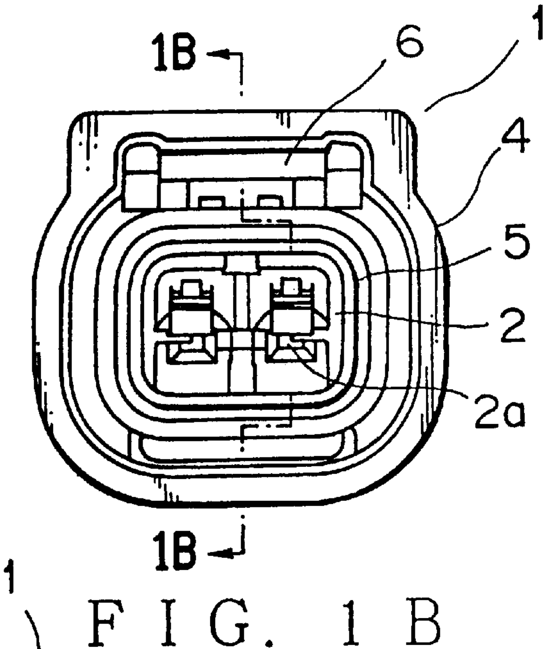
FIG. 1A is an example waterproof connector housing of the present invention seen from the hood portion side.
Figure 1B:
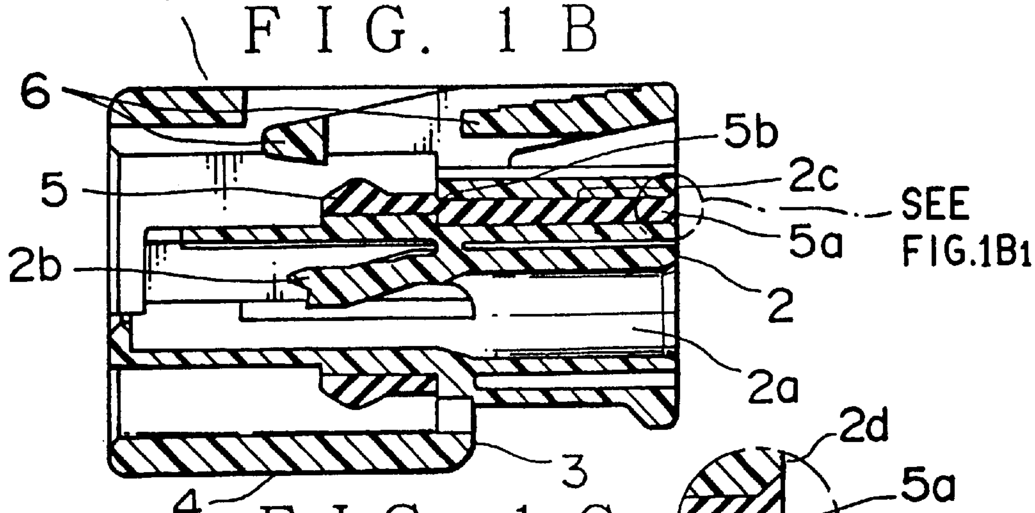
FIG. 1B is a sectional view of the waterproof connector housing taken along line A—A of FIG. 1A.
Figure 1B:
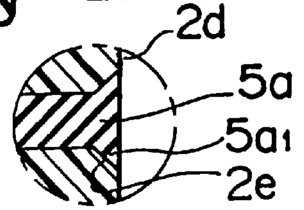
Figure 1C:
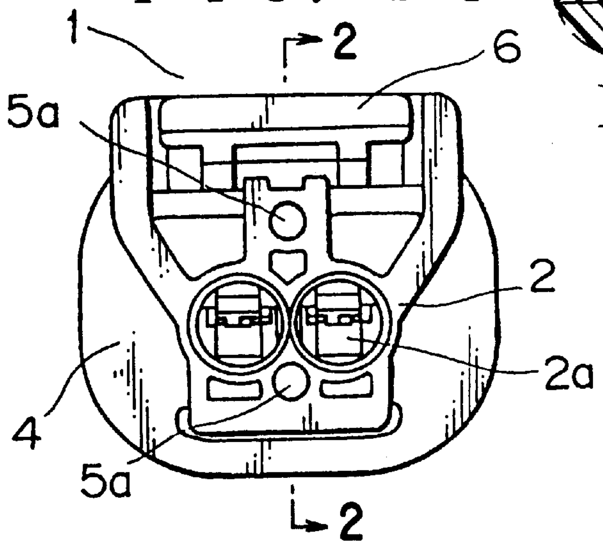
FIG. 1C is a plan view of the waterproof connector housing seen from the terminal insertion side.
Figure 4A:
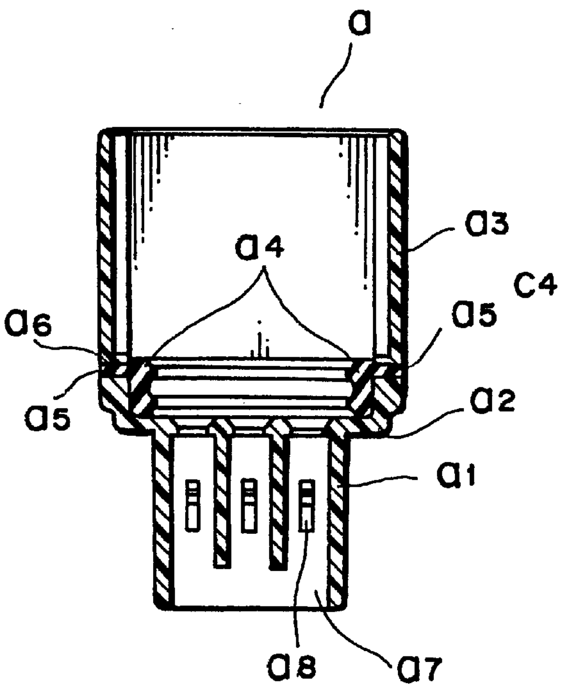
FIG. 4A PRIOR ART
FIG. 4A is a section view of a waterproof connector housing a of the prior art.
Figure 4C:
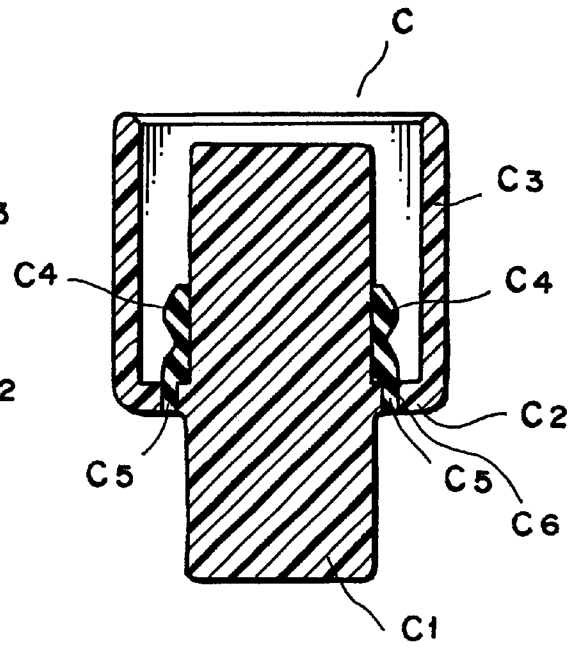
FIG. 4C PRIOR ART
FIG. 4C is a sectional view of a waterproof connector housing c of the prior art.
Figure 4B:
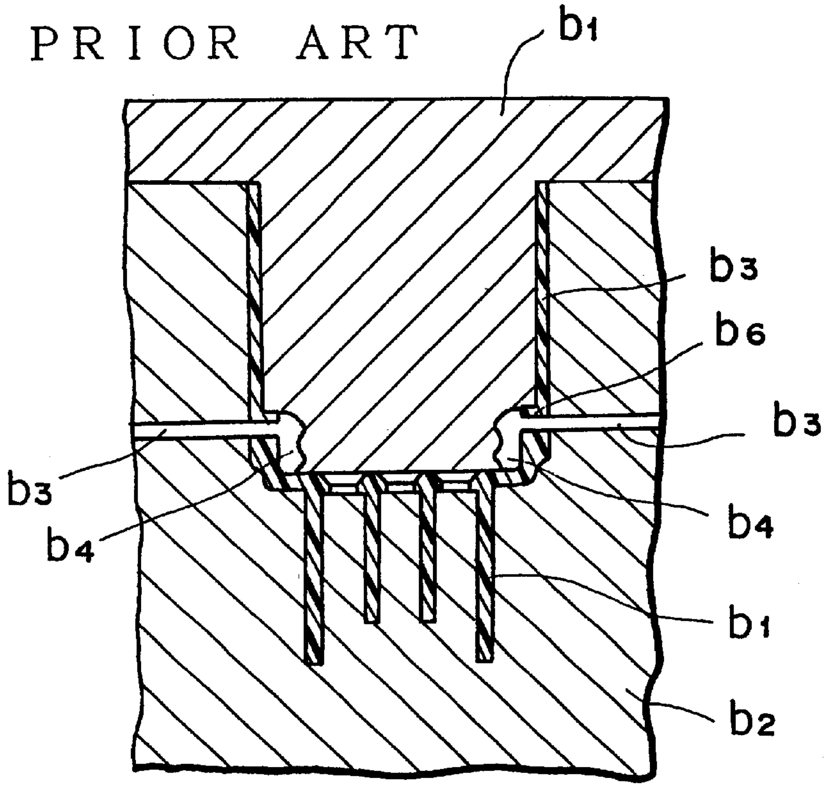
FIG. 4B PRIOR ART
FIG. 4B illustrates a method for manufacturing the waterproof connector housing a of the prior art.

FIG. 1A is a schematic view of the waterproof connector housing 1 seen from the hood portion side. FIG. 1B is a plan view of the waterproof connector housing 1 taken along line A—A of FIG. 1A. FIG. 1C is a plan view of the waterproof connector housing 1 seen from the terminal insertion side. FIG. 2 is a perspective view of the waterproof connector housing 1 taken along line B—B of FIG. 1C.

Reference numeral 2 indicates a housing main body provided with a terminal insertion hole 2*a* in which a stopper 2*b* for preventing an inserted terminal (not shown) from slipping off. The housing main body 2 is also provided with a hood portion 4 for engaging with a mating housing via a stair portion 3. Reference numeral 5 indicates an elastic seal ring for maintaining water-tightness with the mating housing. This elastic seal ring has a holding portion 5*a* which communicates with the terminal insertion side surface 2*d* of the housing main body 2. A stair portion 5*b* is formed on the boundary between the elastic seal ring and the holding portion 5*a,* and a tapered portion 5*a,* is provided on the terminal insertion side of the holding portion 5*a*. The tapered portion $5a_1$ is in contact with a tapered portion 2*e* of the housing main body 2. Not only because of that, but also because the contact area between a holding portion linking hole 2*c* provided on the housing main body and a holding portion 5*a* is large, a terminal can be certainly prevented from slipping off.

Since the housing main body 2 needs to be long enough to internally accommodate and protect a connection portion between a terminal and wires connected to the terminal, the length of the contact portion between the holding portion linking hole 2*c* and the holding portion 5*a* can be far greater than the thickness of the hood portion or the stair portion. The housing main body 2 becomes somewhat wider due to the holding portion linking hole 2*c,* but it is still narrower than the hood portion 4, leaving no influence on the outermost diameter of the connector housing 1. The hood portion 4 can be made smaller, with the stair portion 3 and the side surfaces of the housing main body 2 having no influence on its shape. When providing a locking mechanism 6 for locking the engagement with a mating connector or irregularities for preventing wrong connections, the hood portion can take various forms. The holding portion linking hole 2*c* also functions as a lightening hole for decreasing the volume of resin after molding, so as to prevent sink marks. Thus, the accuracy in manufacturing products of uniform size can be improved.

Such waterproof connector housing can be manufactured as illustrated in FIG. 3. The housing main body and the hood portion are integrally molded by injection molding or the like in advance, and the resultant is set to the elastic seal ring mold (the upper mold 7 and the lower mold 8), so as to form an elastic seal ring cavity portion 7*a* by the upper mold 7 and the housing main body 2. From an elastic material introducing portion 8*a* provided on the lower mold 8, an elastic raw material is introduced into the elastic seal ring cavity portion 7*a* through the holding portion linking hole 2*c,* which links the terminal insertion surface 2*d* to the elastic seal ring cavity portion 7*a*. Since the lower mold 8 is provided with a nozzle portion 8*b* which is in contact with the tapered portion 2*e* situated on the boundary between the holding portion linking hole 2*c* and the terminal insertion surface 2*d* of the housing main body 2, the elastic raw material can be prevented from entering the interface between the terminal insertion surface 2*d* and the lower mold 8.

After the introduction of the elastic raw material, an elastic seal ring is formed by curing or reacting. The waterproof connector housing is taken out after the mold is opened. The two elastic material introducing portions 8*a* provided to the lower mold are situated close to each other, and the holding portion linking hole 5*a* can be used as an elastic raw material path. Thus, the elastic raw material path inside the lower mold 8 can be shortened, and it is possible to minimize the amount of wasted raw material and the trouble taken in removing the cured matter inside the runner. Furthermore, with the structure described so far, no limitation is imposed on the design of components which has various functions, such as the sides of the hood portion 4 and the sides of the housing main body 2.

The waterproof connector housing of the present invention allows enough freedom in design of the hood portion, and can be made smaller. With this waterproof connector housing, the elastic seal ring can be easily molded, reducing the amount of wasted raw material.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method of manufacturing a waterproof connector housing having a hood portion used in engaging with a mating housing and a housing main body containing a terminal insertion portion, a stair portion connecting said hood portion to said terminal insertion portion and an elastic seal ring for maintaining water-tightness with said housing main body inside said hood portion, comprising the steps of:

providing a mold containing cooperating mold portions formed to receive a pre-formed connector housing, wherein said stair portion is cooperable with one of said mold portions to position said housing within said mold, providing a substantially annular seal ring recess in one of said mold portions to cooperate with a part of said housing main body about an axis thereof to form a substantially annular seal ring cavity with said hood portion of said connector housing, forming a linking hole through said terminal insertion portion of said connector housing parallel to the axis thereof, said linking hole communicating at one end with said seal ring cavity and at its other end opening at a distal end of said terminal insertion portion of said connector housing, providing the other mold portion with an elastic material passage in axial alignment, and in communication with, said linking hole, and introducing a fluid elastic material to said passage for fluid flow through said linking hole to said seal ring cavity to fill said cavity and thereby integrally form said seal ring on said housing main body within said hood portion thereof.

* * * * *